United States Patent [19]

Bowers et al.

[11] Patent Number: 5,444,856
[45] Date of Patent: Aug. 22, 1995

[54] APPARATUS AND METHOD FOR SWITCHING ETHERNET MEDIA TYPE

[75] Inventors: Richard A. Bowers, Beaverton; Philip Martin, Banks; Robert A. Jacobs, Portland, all of Oreg.

[73] Assignee: Intel Corporation, Santa Clara, Calif.

[21] Appl. No.: 910,711

[22] Filed: Jul. 7, 1992

[51] Int. Cl.[6] .............................................. G06F 11/20
[52] U.S. Cl. ............................ 395/200.1; 395/500; 364/268; 364/260.1; 364/937; 364/DIG. 1
[58] Field of Search ............... 395/500, 800, 325, 575; 370/85.13, 31, 85.6; 340/825.05; 371/11.2

[56] References Cited

U.S. PATENT DOCUMENTS

| Re. 33,521 | 1/1991 | Mori et al. | 364/200 |
|---|---|---|---|
| 4,803,485 | 2/1989 | Rypinski | 340/825.05 |
| 5,297,141 | 3/1994 | Marum | 370/85.13 |
| 5,299,195 | 3/1994 | Shah | 370/85.6 |
| 5,311,114 | 5/1994 | Sambamurthy et al. | 370/31 |

Primary Examiner—Thomas C. Lee
Assistant Examiner—Felicia Ives
Attorney, Agent, or Firm—Blakely, Sokoloff, Taylor & Zafman

[57] ABSTRACT

A computer system having two ports for connecting the computer system to a computer network by means of different transmission media types. Electronic switching is implemented to select between these two ports. The electronic switching is controlled by software. Depending upon which of the two ports is being utilized to connect the computer system to the network, power is either switched on or off to a transceiver. The switching can be accomplished by a voltage regulator with an enable signal or by means of a MOSFET. The computer system can detect which of the two ports is being utilized as a connection to the network by sending a data packet through each of the ports and determining the status of the transmissions.

8 Claims, 7 Drawing Sheets

APPARATUS AND METHOD FOR SWITCHING ETHERNET MEDIA TYPE

FIELD OF THE INVENTION

The present invention pertains to the field of computer systems. More particularly, the present invention relates to an apparatus and method for allowing a computer, which is part of a local area network, to switch between different media types.

BACKGROUND OF THE INVENTION

In the evolution of computer systems, highly centralized mainframe computers initially dominated the industry. Gradually, less expensive and more versatile minicomputers were developed. With the advent of personal computers, computing power was distributed to end users at the desktop. Eventually, several personal computers were coupled together to form a network. A computer network allowed end users to share files, applications, and peripheral hardware (e.g. printers, storage devices such as disk drives, etc.). Thereby, individuals and work groups could share information and expensive computing resources, while increasing the reliability of the computer system. This type of arrangement came to be known as Local Area Networks (LANs).

Basically, a LAN is comprised of a number of data terminals or data terminal equipment (DTE) which are coupled to transmission lines (i.e. circuits, channels, or trunks) through transceivers. A DTE is an individual device such as a personal computer, a workstation, a mainframe computer, a dumb or intelligent terminal, etc. A transceiver couples a DTE to a transmission line and performs any necessary signal conversions. The transmission lines conduct bits of data between the interconnected DTEs.

The DTEs could be coupled together in various network configurations (i.e., topologies). Some of the more popular topologies include the star, ring, tree, and bus topologies. In addition, different types of protocols for these networks also evolved. A protocol defines the format and relative timing of message exchanges in the LAN. One widely used protocol is known as Carrier Sense Multiple Access with Collision Detection (CSMA/CD), which is also referred to as Ethernet. The Institute of Electrical and Electronic Engineers (IEEE) standard 802.3 sets forth the specification for Ethernet. According to IEEE 802.3, the transmission lines coupling the various DTEs on an Ethernet LAN can be one of several different physical media. Some examples of different media which can be used include twisted pairs, Attachment Unit Interface (AUI) cables, coaxial cables, and fiber-optic cables.

Traditionally, electrical and electronic communications were implemented by twisting together two insulated copper wires; hence, the term twisted pair. To this date, many telephone systems are still based on the twisted pair, and the wiring within buildings for telephone systems is commonly comprised of pairs of copper wires. Consequently, computers on a network can be conveniently coupled together via the twisted pair wiring already existing in most workplaces. However, one disadvantage associated with twisted pairs is that the electrical characteristics of unequalized and unconditioned copper wire introduce distortions which increase with speed and distance.

AUI cabling, is comprised of four twisted shielded pairs for conducting differential signals, a 12 volt power line, and a master shielding which encompasses all the wires. The effective distance for AUI cabling is approximately 50 meters.

For broadband systems and for many baseband systems, an alternative to twisted pairs is coaxial cable. Coaxial cables have a single center conductor, surrounded by an insulator which is, in turn, surrounded by a metal shield (e.g., wire-mesh, foil, etc.). Coaxial cables can handle greater bandwidths and are less susceptible to outside noise. However, coaxial cable is typically more expensive.

Presently, fiber optic cables are being implemented in computer networks. Fiber optics is not susceptible to electrical noise and has a very high bandwidth and transmission speed. However, splicing and tapping the optical cable is an expensive and difficult process. Thus, each of the different media has its advantages and drawbacks. There is no one "best" transmission medium. The selection of a medium depends on the use to which it will be put.

In order to increase flexibility and versatility, computers are being designed so as to be compatible with different transmission media which can be found in a network environment. The goal is to provide the computer with the capability of interfacing with the medium ultimately selected by the end user. Typical prior art approaches provided multiple input/output (I/O) ports. Each port is matched to interface with one of the various transmission media. In order to select the proper port corresponding to the chosen media, jumpers are provided on the printed circuit boards within the computers. A jumper is inserted onto the printed circuit board to provide a signal path for enabling the desired port. The other ports are disabled by removing their jumpers. One disadvantage with this approach was that inserting and removing the jumpers was quite cumbersome, tedious, time consuming, and rather annoying. A more sophisticated approach entailed substituting switches in place of the jumpers. Ports were enabled and disabled by means of the switches, thereby eliminating the hassle of inserting and removing jumpers.

However, both prior art approaches (i.e., jumpers and switches) suffered several disadvantages. In order to effectuate the changes via the jumpers or switches, the computer is first powered down, the computer housing is then removed, the printed circuit board containing the jumpers or switches is unplugged from the motherboard, the proper jumper insertion/removal or switching is made, and then the board is inserted back into the motherboard and the computer housing is replaced. Clearly, this is a cumbersome, labor intensive and time consuming task. Another disadvantage is that the user might accidentally cause physical damage to some part of the computer while trying to effectuate the jumping/switching. Yet another disadvantage is that the user might not know how to effectuate the changes. More likely, a user would not know which of the jumpers/switches corresponds to which of the multiple ports. In the case of switches, the user might not know which state results in a short circuit and which state results in an open circuit. Most users would require detailed instructions and documentation. Even then, inadvertent errors are easily made. In which case, the user has to repeat the whole process all over again. Furthermore, the jumpers and switches increase production costs in terms of additional parts, increased manufacturing times, testing, etc.

Thus, what is needed is an apparatus and method which permits the user to set-up or change the transmission media type for a computer on a local area network quickly, easily, and safely. It would also be preferable if minimal additional hardware other than those already available in computer systems designed for a networking environment were required for such an implementation.

SUMMARY AND OBJECTS OF THE INVENTION

In view of the problems associated with coupling a computer to a computer network system, one object of the present invention is to permit a user to set-up or change the transmission media type quickly, easily, and safely.

Another object of the present invention is to electronically enable or disable the appropriate media transceiver.

Another object of the present invention is to provide software for controlling the electronic switch.

Yet another object of the present invention is to provide the computer with the capability of detecting the media type used to connect the computer with the network.

Another object of the present invention is to implement a voltage regulator or a switching transistor to turn power on or off to the appropriate media transceiver.

These and other objects of the present invention are implemented in a computer system having two ports for coupling the computer system to a local area network. The first port is used to couple the computer system to the network by means of an AUI. The second port is used to couple the computer system to the network by means of twisted pair wiring or coaxial cable. The computer system detects which of the two ports is presently being utilized to connect the computer system to the network. This is accomplished by transmitting a data packet addressed to the computer system first through the twisted pair/coax port. If the transmission is successful, this signifies that the twisted pair/coax port is presently being utilized to connect the computer system to the network. If the transmission is unsuccessful, the same procedure is repeated by using the AUI port. If this second transmission is successful, it indicates that the AUI port is being utilized to connect the computer system to the network. Otherwise, an unsuccessful second transmission indicates that neither port is being utilized.

Once the port which is presently being utilized has been determined, a control signal is generated to toggle on/off the transceiver associated with the twisted pair/coax port. If the computer system is connected to the network via the AUI port, the control signal disables the transceiver by cutting off its power source. Conversely, if the computer system is coupled to the network via the twisted pair/coax port, the control signal enables the transceiver by powering it up. In the currently preferred embodiment a voltage regulator supplies or cuts off power to the transceiver according to the control signal. In an alternative embodiment a MOSFET is utilized to switch power on/off to the transceiver, again, according to the control signal. A non-volatile EPROM can be implemented to store information regarding which one of the two ports is being utilized to connect the computer system to the network. This information is retained whenever the computer system is cycled on/off.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for enabling a user to set-up or change the transmission media type for a computer on a local area network is described. In the following description, for purposes of explanation, specific types of electrical components and specific component values are set forth in order to provide a thorough understanding of the present invention. It will be obvious, however, to one skilled in the art that these specific details need not be used to practice the present invention. In other instances, well-known structures and circuits, have not been shown in detail in order to avoid unnecessarily obscuring the present invention.

Figure 1:
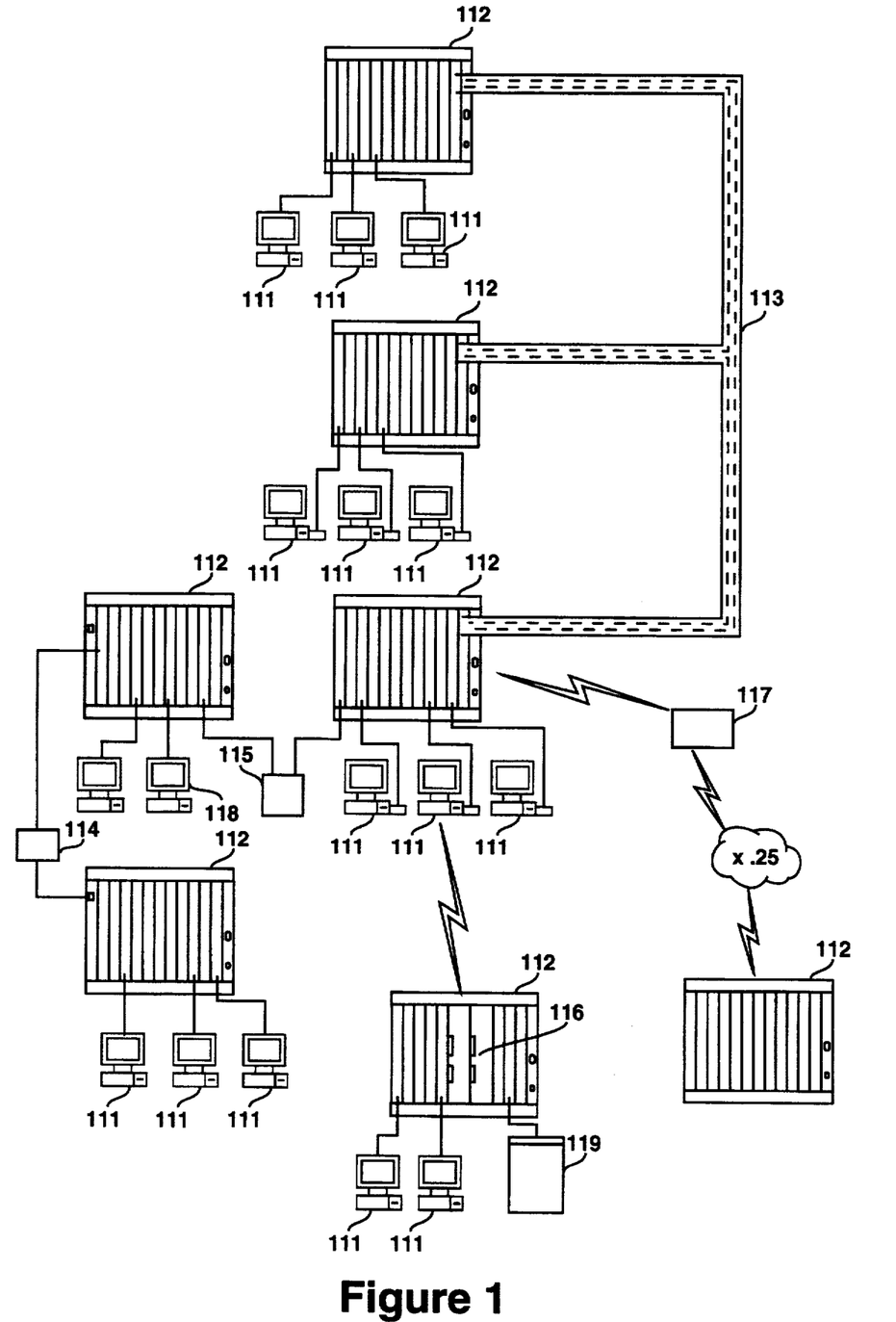
FIG. 1 illustrates a typical local area network system in which the present invention can be implemented.

FIG. 1 illustrates a typical local area network (LAN) system in which the present invention can be implemented. A number of users access the network via data terminal equipment (DTE) 111 which can be a personal computer, a workstation, a dumb terminal, etc. The DTE 111 are coupled to concentrators 112 by means of transmission lines. These transmission lines can be comprised of different media, such as unshielded twisted pair wires, AUI cables, coaxial cables, and fiber optic cables. Concentrators 112 act as focal points for managing and routing network data transmissions. A number of concentrators can be intercoupled by means of a fiber optic cable 113. When two network segments are coupled by a long cable run, the signals become attenuated. Hence, a repeater 114 is used to amplify the signals.

A bridge 115 can be used to couple two concentrators which service network segments having differing protocols (e.g. an Ethernet-to-Token Ring bridge). Bridge 115 listens to data transmissions, examines each data packet's destination, makes any necessary conversions, and discriminately forwards each data packet. A remote bridge 116 allows the coupling of geographically dispersed network segments through a variety of serial links. A router 117 is used to interface and couple two networks having differing network layers (e.g., Token Bus vs. X.25). A router also has the capability of directing data packets to their final destination by the least costly available path. By adding a file server 119 to the network, users are able to share stored files and applications.

Figure 2:
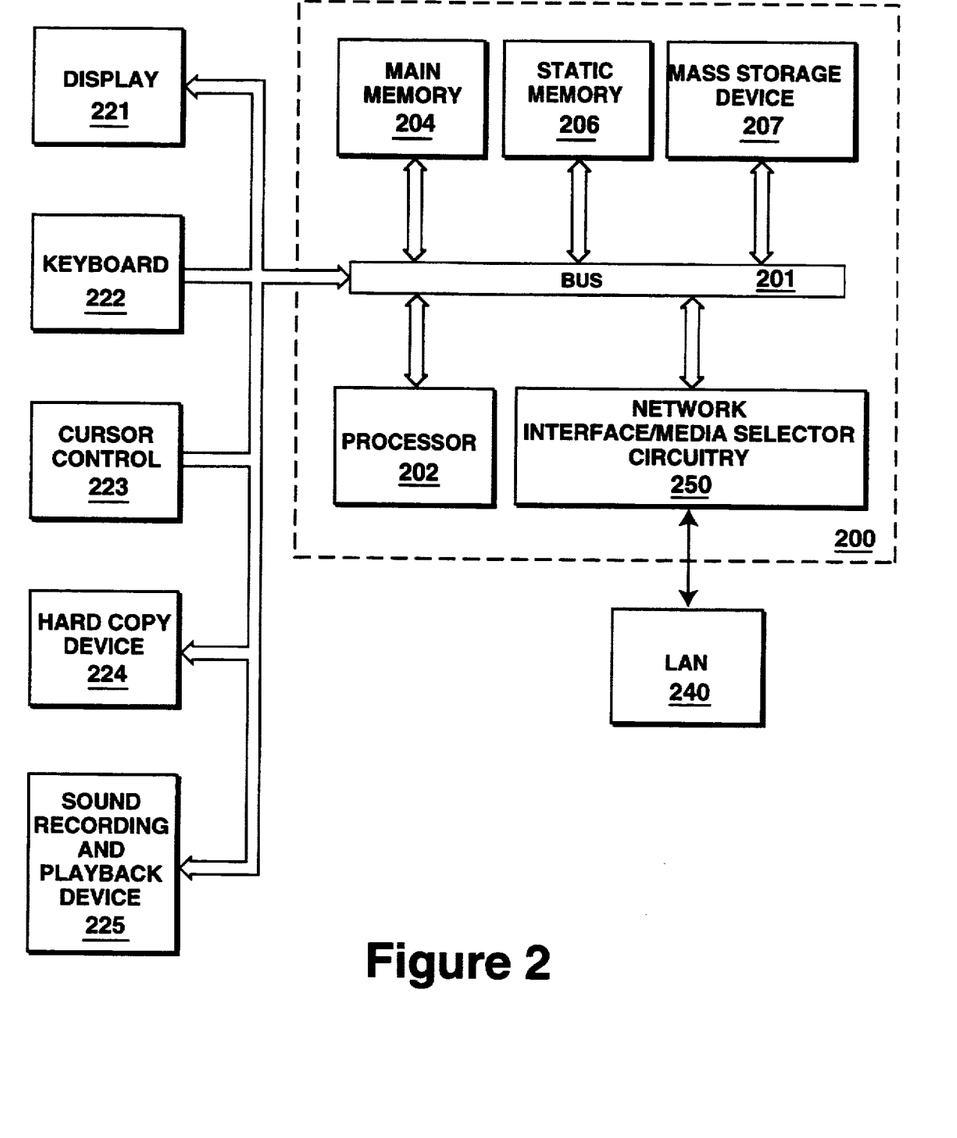
FIG. 2 illustrates a block diagram of a personal computer upon which the preferred embodiment of the present invention is implemented.

The following detailed description is made in reference to a personal computer which is part of an Ethernet LAN. However, it should be noted that the present invention can readily be applied to a variety of different network systems, protocols, configurations, and devices. Referring to FIG. 2, the personal computer upon which the preferred embodiment of the present invention is implemented is shown as 200. Personal computer 200 comprises a bus or other communication means 201 for communicating information, and a processing means 202 coupled with bus 201 for processing information. System 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Personal computer 200 also comprises a read only memory (ROM) and/or other static storage device 206 coupled to bus 201 for storing static information and instructions for processor 202 and a data storage device 207 such as a magnetic disk or optical disk and its corresponding disk drive. Data storage device 207 is coupled to bus 201 for storing information and instructions.

Personal computer 200 may further be coupled to a display device 221, such as a cathode ray tube (CRT) coupled to bus 201 for displaying information to a computer user. An alphanumeric input device 222, including alphanumeric and other keys, may also be coupled to bus 201 for communicating information and command selections to processor 202. An additional user input device is cursor control 223, such as a mouse, a trackball, or cursor direction keys, coupled to bus 201 for communicating direction information and command selections to processor 202, and for controlling cursor movement on display 221. This input device typically has two degrees of freedom in two axes, a first axis (e.g. x) and a second axis (e.g. y), which allows the device to specify any position in a plane. Another device which may be coupled to bus 201 is hard copy device 224 which may be used for printing instructions, data, or other information on a medium such as paper, film, or similar types of media. Lastly, personal computer 200 may be coupled to a device for sound recording and/or playback 225 such an audio digitizer means coupled to a microphone for recording information. Further, the device may include a speaker which is coupled to a digital to analog (D/A) converter for playing back the digitized sounds.

Figure 3:
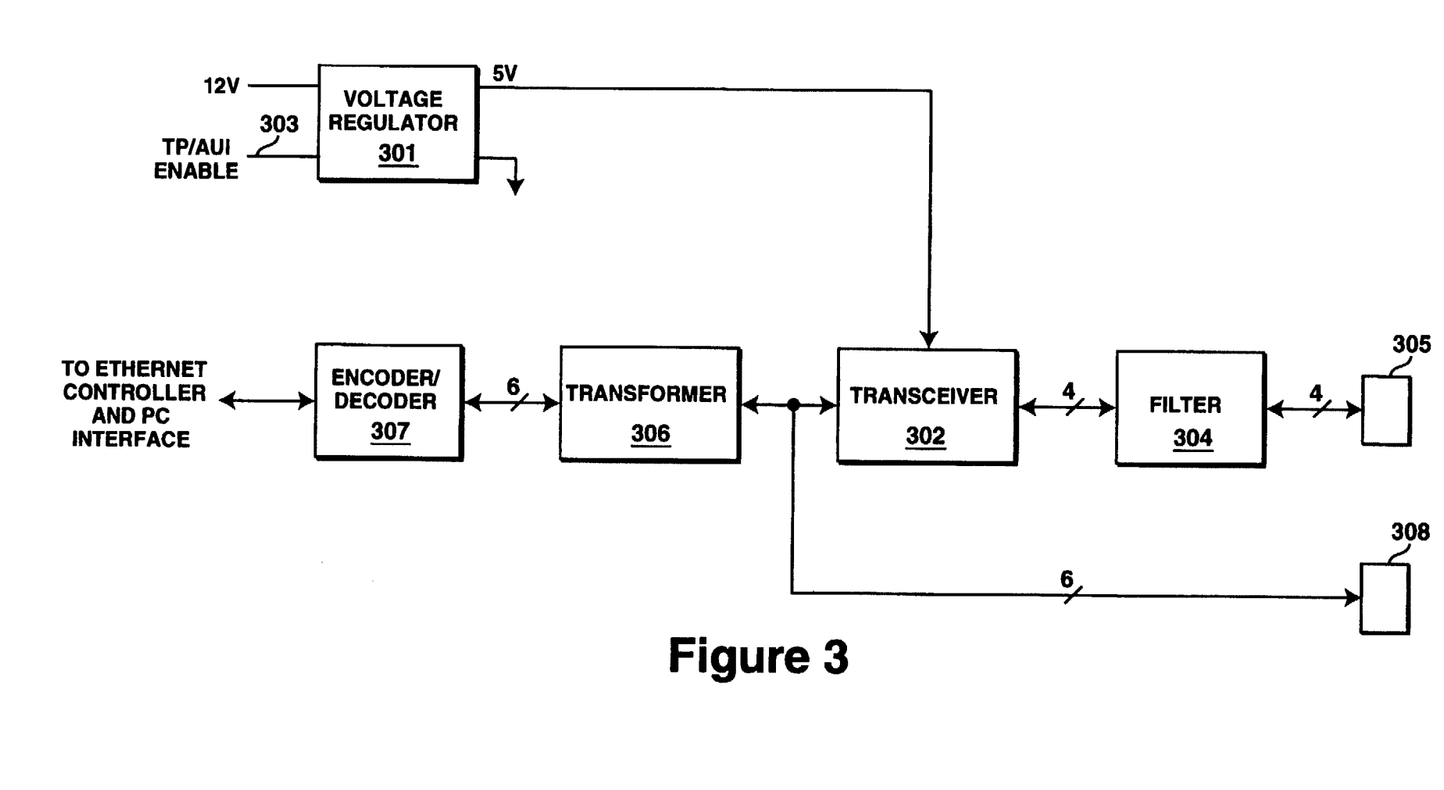
FIG. 3 illustrates a block diagram of the media selector circuitry.

In order to integrate personal computer 200 with a LAN 240, network interface/media selector circuity 250 is included. Circuitry 250 provides the necessary signals to interface personal computer 200 with LAN 240 and also selects the port corresponding to the transmission media used to couple the personal computer 200 to LAN 240. FIG. 3 illustrates a block diagram of the media selector circuitry. A 12-volt power line is converted into 5 volts by voltage regulator 301. The 5 volts supplied by voltage regulator 301 is used to power transceiver 302. Rather than being powered by a 5 volt line on the printed circuit board, transceiver 302 is powered by voltage regulator 301. A TP/AUI enable signal 303 is input to voltage regulator 301. The TP/AUI enable signal 303 is used to toggle voltage regulator 301 on/off. In other words, enable signal 303 controls whether transceiver 302 is powered up or down.

Transceiver 302 is used to provide signal conversions for interfacing with signals via either twisted pair wiring or coaxial cable. In the currently preferred embodiment, transceiver 302 is an 82506TB Twisted Pair Medium Attachment Unit, manufactured by Intel ®. Transceiver 302 is coupled to filter 304 which is used to filter the transmitted and received signals to/from port 305. Port 305 can be a standard RJ45 telephone connector for connecting twisted pair wiring to the personal computer. There are two sets of twisted pairs which are connected: one set for transmission of data and a second set for receipt of data. Port 305 can also be a female BNC type connector for interfacing with a coaxial cable having a male BNC connector.

Transceiver 302 is also coupled to transformer 306 and connector 308. Transformer 306 is used to provide isolation for the signals between the network and the personal computer. Connector 308 is a 15 pin D-SUB connector for coupling an AUI cable to the personal computer. Transformer 306 is A.C. coupled to encoder/decoder 307. Encoder/decoder 307 converts signals from the controller into a Manchester encoded signal suitable for data communication and vice versa (i.e., converts Manchester encoded signals from the transmission medium to a signal recognizable by the controller). Encoder/decoder 307 is also coupled to an Ethernet controller and a personal computer (PC)interface.

Figure 4A:
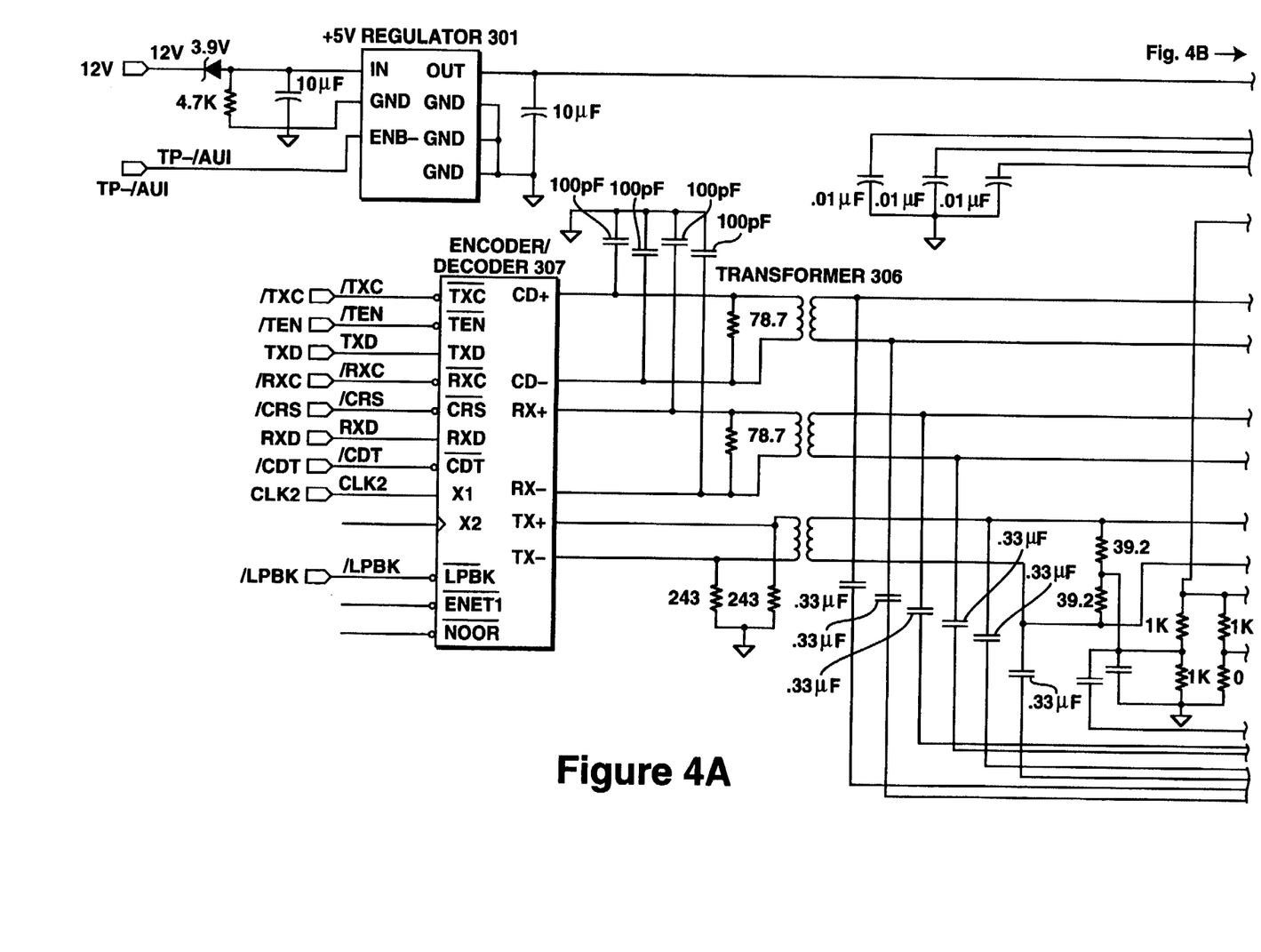
FIGS. 4A and 4B are a circuit diagram illustrating in great detail the currently preferred embodiment of the media selector.
Figure 4B:
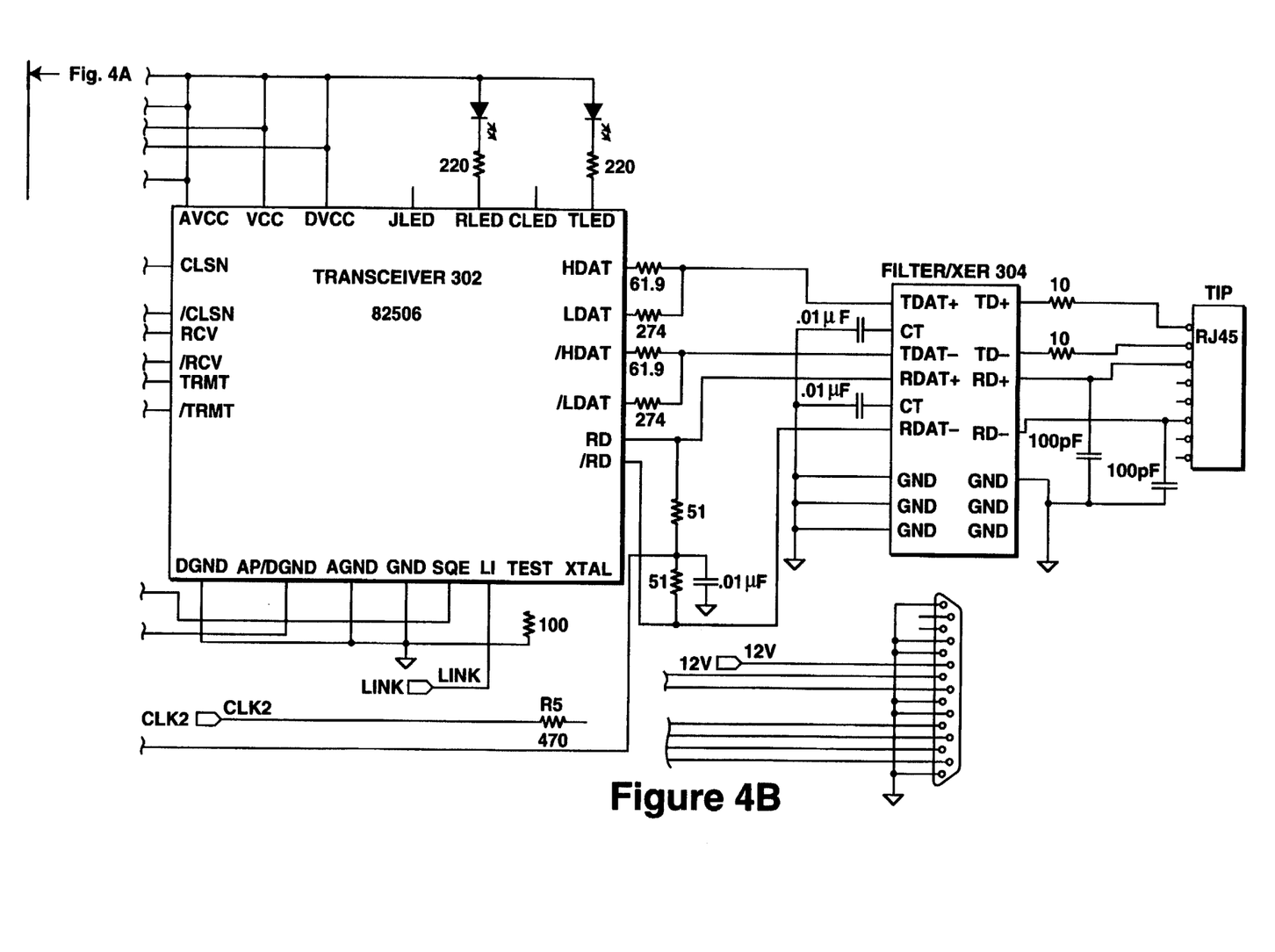

FIGS. 4A and 4B are a circuit diagram illustrating, in much greater detail, the currently preferred embodiment of the media selector. A description of the specifics of its operation is the same as has been described above in reference to FIG. 3.

The selection of the port corresponding to the medium being accessed is controlled by a computer program. In the currently preferred embodiment, the controlling software detects which media type has been connected to the personal computer. This is accomplished by enabling one of the ports and sending a test packet of data through that port. The test data packet is addressed back to the personal computer. An Ethernet controller generates a status signal which indicates whether a packet was properly sent and received. By examining the status signal generated by the Ethernet controller on the test data packet, the controlling software can determine whether the transfer was successful. A successful transfer indicates that the proper signals were sent back and that the port has been physically connected to the network. If the Ethernet controller generates an error signal, such as failing to receive a carrier sense signal, this indicates to the controlling software that the port has not been connected to the network. After detecting an error signal from the Ethernet controller, the controlling software repeats the testing process on the other ports (i.e., enabling another port, sending a test packet back to itself, determining the status of the test data packet transfer, etc.). Assuming that there had been a physical connection to one of the ports, the controlling software can detect the connected port and activate that port.

For instance, if a user connected the computer to the Ethernet network using an RJ45 connector and twisted pair wiring, the controlling software first tests that port by activating it. The controlling software activates the port by sending a signal (e.g., +5 volts) on the TP/AUI enable line to enable the voltage regulator in the media selector. This causes the twisted pair transceiver to be supplied 5 volts, which turns it "on", thereby activating the twisted pair port. Next, the controlling software sends a test packet through that port. The connection is detected when the Ethernet controller generates a status signal indicating that the test data packet was properly transferred. Thereupon, the controlling software keeps the voltage regulator enabled.

Conversely, if a user had connected the computer to the Ethernet network via an AUI cable, the controlling software first determines whether the other port has been connected (i.e., activating the other port, sending a test data packet, determining the status of the transfer). Once it is determined that there is no connection to the other port, the controlling software turns "off" the transceiver. This is done by sending a signal (e.g., 0 volts) on the TP/AUI enable line which disables the voltage regulator, resulting in the removal of the 5 volt power supply to the transceiver. The controlling software then sends a test data packet via the AUI port. If the network is operating correctly and the connection was properly made, the Ethernet controller generates a status signal indicating a proper transfer of the test data packet. Thereby, the software controller detects that a connection has been made to the AUI port, and the transceiver is kept "off" (i.e., no 5 volts power supplied to the transceiver). In other words, the transceiver is turned "off" (i.e., disabled) when the computer is not connected to the Ethernet network via twisted pair wiring/coaxial cable.

Otherwise, if the transceiver were left "on", it would generate continuous error messages. The transceiver would be sending data packets to the open terminal, expecting to receive valid replies. When the replies are not forthcoming, the transceiver generates an error signal (e.g., a bad packet signal). Even though the data packet was successfully sent via the AUI port, a bad packet signal is, nonetheless, generated. Thus, it is important to disable the transceiver when the twisted pair/coaxial cable port is unconnected.

Figure 5:
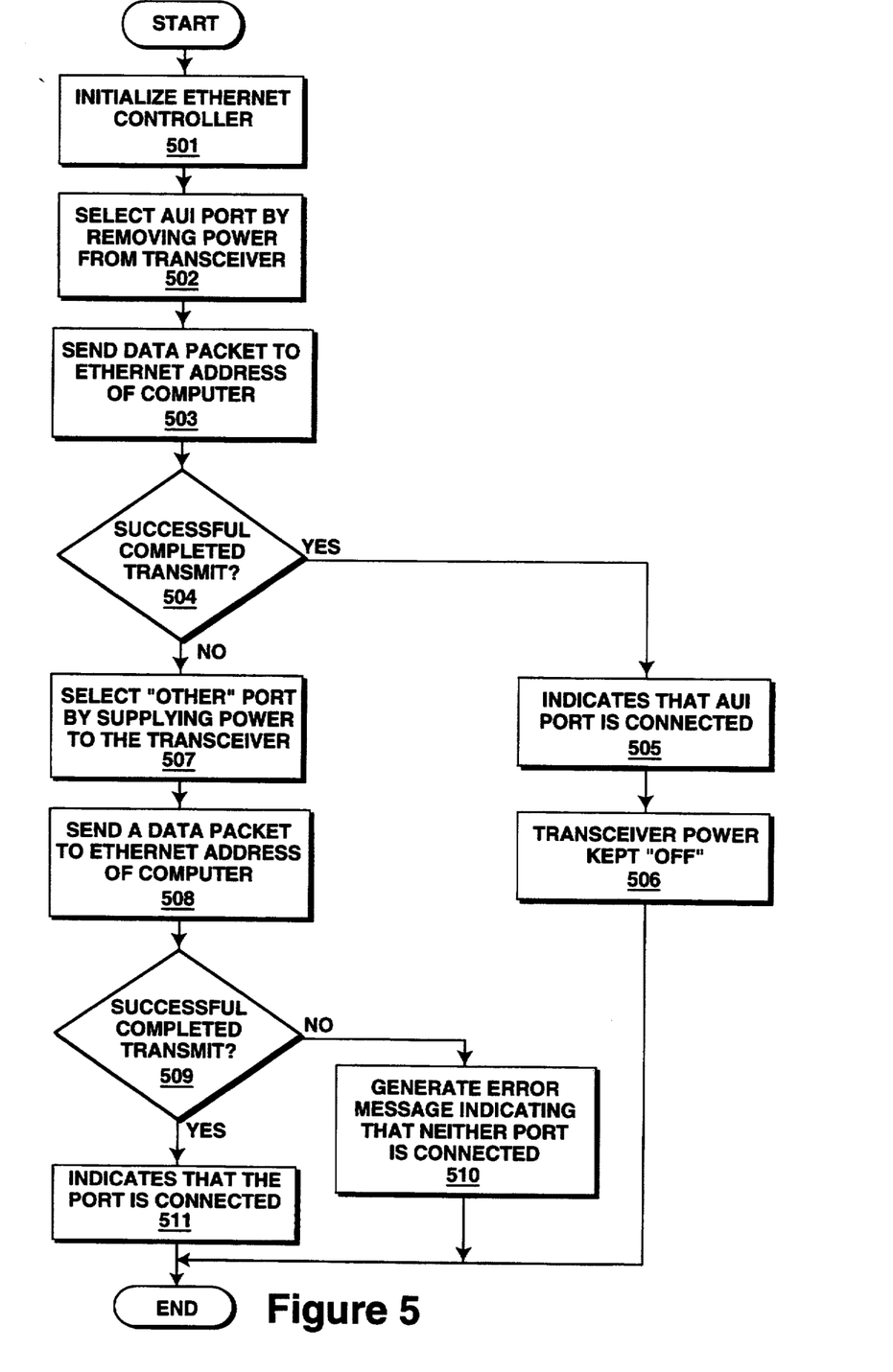
FIG. 5 is a flow chart diagram illustrating the steps for detecting which port is being utilized to connect a computer to a network.

FIG. 5 is a flow chart diagram illustrating the steps for detecting which port is being utilized to couple the computer to the Ethernet network. First, the Ethernet controller is initialized, step 501. Next, the AUI port is selected by removing the power from the transceiver, step 502. This is accomplished by setting a bit in a control register. A data packet is then sent to the Ethernet address of the computer, step 503. A determination is made as to whether the completed transmit was successful, step 504. If the data packet was successfully transmitted, this indicates that the AUI port is connected, step 505. The transceiver power is kept "off", step 506. If the data packet was not successfully transmitted, the "other" port is selected by supplying power to the transceiver, step 507. Again, a data packet is sent to the Ethernet address of the computer, step 508. A determination is made as to whether the completed transmit was successful, step 509. If the transmit was not successful, an error message is generated indicating that neither port is connected, step 510. A successful transmission indicates that the port is connected, step 511.

The present invention can be applied to select and switch between more than just two ports. This is accomplished by individually testing each of the ports in sequence, as described above for the two-port implementation.

If a user mistakenly couples the computer to the network using both ports (e.g., AUI and twisted pair wiring), there results multiple concurrent transmissions from the two sources. Such a condition is known as multiple "collisions". The data becomes garbled and useless. The Ethernet controller generates an appropriate error signal to so notify the user of this condition. The user can then determine which of the two ports is to be disconnected.

Figure 6:
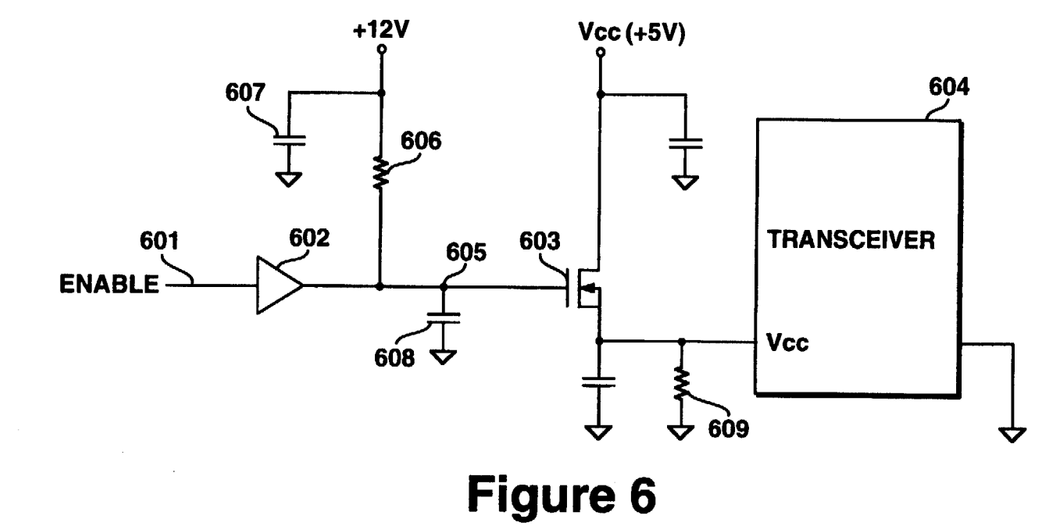
FIG. 6 is a circuit diagram illustrating an alternative embodiment for switching a transceiver on/off.

FIG. 6 is a circuit diagram illustrating an alternative embodiment for switching the transceiver on/off. Rather than using a voltage regulator, a transistor is implemented to toggle the power supply to the transceiver. A software programmable enable line 601, similar to the enable line described above, is input to a TTL open-collector buffer 602. The output of open-collector buffer 602 is coupled to the gate of a metal-oxide semiconductor field-effect transistor (MOSFET) 603. The source of MOSFET 603 is coupled to Vcc (i.e., +5 volts). The drain of MOSFET 603 is coupled to the Vcc of transceiver 604. MOSFET 603 can be a power MOSFET such as the SMD 25NO5-45L, available from Siliconix ®.

The circuit illustrated in FIG. 6 operates as follows. A "high" signal, such as +5 volts, on the enable line 601 turns "off" the open-collector buffer 602. With the open-collector buffer 602 in the "off" state, node 605 is pulled "high" (i.e., +12 volts) through the 2.2 Kohm resistor 606. The two capacitors 607 and 608 are utilized to keep node 605 stable. Consequently, the gate of MOSFET 603 is at +12 volts. The gate-source voltage of MOSFET 603 is 7 volts (i.e., 12 volts-5 volts). This turns "on" MOSFET 603. Although a 3 volt gate-source voltage is sufficient to turn "on" MOSFET 703, 7 volts are utilized so that MOSFET 603 is turned on "hard". Typically, the harder that MOSFET 603 is turned on, the less its "on" resistance. A lower resistance is beneficial because this results in a lower voltage drop under constant current in the MOSFET translates into less power being consumed, which also correlates to less heat being dissipated. When MOSFET 603 is turned "on", +5 volts is supplied to transceiver 604. Thereby, a "high" enable signal on line 601, supplies power (i.e., Vcc of +5 volts) to transceiver 604, which effectively switches it "on".

Conversely, if the enable line 601 is "low" (e.g., ground), open-collector buffer 602 is turned "on" which causes node 605 to effectively be at ground. As a result, MOSFET 603 is turned "off". Them is a very high source-drain impedance which cuts off the +5 volts power supply to transceiver 604. Resistor 609 is utilized to provide a "soft" ground for transceiver 604. Hence, a "low" signal on enable line 601 removes the power supplied to transceiver 604, which effectively switches it "off".

In an alternative embodiment, instead of detecting which port is connected and switching to that port, a set-up utility program is run by the user. The utility program queries the user to determine the port that is being utilized. The user specifies the port, and the utility program then selects that port, same as described above (i.e., setting a register bit to toggle on/off the voltage regulator supplying power to the transceiver). Once a port has been selected by the user, a bit is set in a non-volatile EPROM to reflect the selected port. Thereafter, when the computer is powered up, the Ethernet controller reads this bit stored in the EPROM to determine which port to access. If the user wishes to change to a different port, the set-up utility program is executed, and the user then specifies the different port. In the currently preferred embodiment, if the user does not make a selection, the controller defaults to the twisted pair port.

Thus, an apparatus and method for switching Ethernet media type is disclosed.

What is claimed is:

1. A computer system having an interface for coupling said computer system with a computer network, said interface comprising:
   a first input/output port for connecting said computer system to said computer network by a first transmission media type, said first input/output port being selectively enabled or disabled for data transfer,
   a second input/output port for connecting said computer system to said computer network by a second transmission media type, said second input/output port being always enabled for data transfer,
   means for generating an enable/disable signal for selectively enabling or disabling said first port,
   detecting means, coupled to said first input/output port and said second input/output port, for detecting which one of said first or said second port is connected to said computer network, said detecting means comprising:
   a) means for controlling said means for generating to enable said first port,
   b) means for transmitting a data packet to an address corresponding to said computer system via said first port;
   c) means for determining a status of a data packet transmission transmitted to said address corresponding to said computer system,
   d) means for controlling said means for generating to disable said first port if said data packet is not successfully transmitted on said first port,
   e) means for transmitting a data packet to an address corresponding to said computer system via said second port if said data packet is not successfully transmitted on said first port, and
   a means for transmitting and receiving data via one of said first port or said second port, depending on which of said first and said second port is connected to said computer network.

2. The computer system of claim 1 further comprising a voltage regulator which supplies power to a transceiver according to said enable/disable signal.

3. The computer system of claim 2 further comprising a non-volatile memory means for storing a state of said enable/disable signal.

4. The computer system of claim 1, wherein said first transmission media type is twisted pair wiling and said second transmission media type is an attachment unit interface (AUI) cable.

5. The computer system of claim 1, wherein said first transmission media type is a coaxial cable and said second transmission media type is an attachment unit interface (AUI) cable.

6. The computer system of claim 1 further comprising a transistor for switching power to a transceiver based on said enable/disable signal.

7. The computer system of claim 6, wherein said transistor is a metal-oxide semiconductor field-effect transistor (MOSFET).

8. In a computer system having an interface for coupling said computer system with a computer network, said interface having a first input/output port for connecting said computer system to said computer network by a first transmission media type, said first input/output port being selectively enabled or disabled for data transfer, said interface including second input/output port for connecting said computer system to said computer network by a second transmission media type, said second input/output port being always enabled for data transfer, a method for selectively determining which of a first or a second port is connected to said computer network, said method comprising the steps of:
   generating an enable signal to enable said first port;
   transmitting a data packet to an address corresponding to said computer system via said first port;
   determining a status of a data packet transmission transmitted to said address corresponding to said computer system,
   generating a disable signal to disable said first port if said data packet is not successfully transmitted on said first port, transmitting a data packet to an address corresponding to said computer system via said second pat if said data packet is not successfully transmitted on said first port, and
   transmitting and receiving data via one of said first port or said second port, depending on which of said first and said second port is connected to said computer network.

* * * * *

UNITED STATES PATENT AND TRADEMARK OFFICE
CERTIFICATE OF CORRECTION

| | | |
|---|---|---|
| PATENT NO. | : | 5,444,856 |
| DATED | : | August 22, 1995 |
| INVENTOR(S) | : | Bowers et al. |

It is certified that error appears in the above-identified patent and that said Letters Patent is hereby corrected as shown below:

In column 8 at line 45 delete "Them" and insert --There--

Signed and Sealed this

Twenty-ninth Day of July, 1997

*Attest:*

BRUCE LEHMAN

*Attesting Officer*  Commissioner of Patents and Trademarks